US012790957B2

(12) United States Patent
Elms et al.

(10) Patent No.: US 12,790,957 B2
(45) Date of Patent: Nov. 10, 2026

(54) METHOD FOR REDUCING DAMAGE TO A COMPONENT OF A GAS TURBINE ENGINE

(71) Applicant: ROLLS-ROYCE plc, London (GB)

(72) Inventors: Jacob D Elms, Derby (GB); Alison R Pawley, Derby (GB); Merren A Jones, Derby (GB); Stephen J Covey-Crump, Derby (GB); Nicholas M Bojdo, Derby (GB); Rory J Clarkson, Derby (GB); Torsten Geis, Derby (GB); Ngunjoh L Ndamka, Derby (GB)

(73) Assignee: ROLLS-ROYCE plc, London (GB)

( * ) Notice: Subject to any disclaimer, the term of this patent is extended or adjusted under 35 U.S.C. 154(b) by 208 days.

(21) Appl. No.: 18/948,728

(22) Filed: Nov. 15, 2024

(65) Prior Publication Data

US 2025/0179933 A1 Jun. 5, 2025

(30) Foreign Application Priority Data

Dec. 1, 2023 (GB) ..................................... 2318386

(51) Int. Cl.
*F01D 21/00* (2006.01)
*G08G 5/34* (2025.01)

(52) U.S. Cl.
CPC ............. *F01D 21/003* (2013.01); *G08G 5/34* (2025.01)

(58) Field of Classification Search
CPC ......... G08G 5/76; F01D 21/00; F01D 21/003; F01D 21/10
See application file for complete search history.

(56) References Cited

U.S. PATENT DOCUMENTS

| | | | |
|---|---|---|---|
| 3,748,905 A | 7/1973 | Fletcher et al. |
| 4,888,948 A | 12/1989 | Fisher et al. |
| 11,549,382 B2 | 1/2023 | Keshavan et al. |
| 2005/0183575 A1 | 8/2005 | Fox |
| 2008/0149141 A1 | 6/2008 | Sales |
| 2010/0288034 A1 | 11/2010 | Agrawal et al. |
| 2012/0152038 A1 | 6/2012 | Cho |

(Continued)

FOREIGN PATENT DOCUMENTS

| | | |
|---|---|---|
| CN | 110016666 A | 7/2019 |
| EP | 2 233 600 A1 | 9/2010 |

(Continued)

*Primary Examiner* — Aaron L Troost
(74) *Attorney, Agent, or Firm* — Oliff PLC

(57) ABSTRACT

A method includes: determining first atmospheric agents that are predicted to be ingested by a gas turbine engine during operation in a predefined route of an aircraft and their composition, particle size, and concentration; determining a composition and an amount of a predicted deposit that is predicted to form on the component based on the composition, the particle size, and the concentration of the first atmospheric agents; determining a predicted damage to the component based at least on the composition and the amount of the predicted deposit and a composition of a coating of the component; determining locations at which second atmospheric agents are present in air that reduce the predicted damage to the component and their composition, particle size, and concentration; determining an alternative route including the locations; and operating the gas turbine engine at the locations in the alternative route.

13 Claims, 4 Drawing Sheets

(56) References Cited

U.S. PATENT DOCUMENTS

| | | | | |
|---|---|---|---|---|
| 2015/0159509 | A1 | 6/2015 | Scipio et al. | |
| 2017/0016820 | A1 | 1/2017 | Tabaru et al. | |
| 2017/0092136 | A1* | 3/2017 | Agrawal ................ | G01C 21/02 |
| 2017/0115197 | A1 | 4/2017 | Niemeläet al. | |
| 2017/0286572 | A1 | 10/2017 | Hershey et al. | |
| 2018/0068498 | A1 | 3/2018 | Hodge | |
| 2018/0154392 | A1 | 6/2018 | Keshavan et al. | |
| 2019/0048475 | A1 | 2/2019 | Ndamka et al. | |
| 2019/0308191 | A1 | 10/2019 | Hart et al. | |
| 2021/0131305 | A1 | 5/2021 | Keshavan et al. | |
| 2021/0255068 | A1 | 8/2021 | Collins et al. | |
| 2021/0324201 | A1 | 10/2021 | Ramaswamy et al. | |
| 2021/0354253 | A1 | 11/2021 | Whittle et al. | |
| 2023/0048806 | A1* | 2/2023 | Kawada ................ | F01D 21/003 |
| 2023/0326354 | A1* | 10/2023 | Durant ................... | B64D 45/00<br>701/3 |

FOREIGN PATENT DOCUMENTS

| | | | |
|---|---|---|---|
| EP | 3 779 124 | A1 | 2/2021 |
| GB | 2 529 271 | A | 2/2016 |
| WO | 2014/045099 | A2 | 3/2014 |
| WO | 2016/014455 | A1 | 1/2016 |
| WO | 2021/070274 | A1 | 4/2021 |

* cited by examiner

METHOD FOR REDUCING DAMAGE TO A COMPONENT OF A GAS TURBINE ENGINE

CROSS-REFERENCE TO RELATED APPLICATIONS

This specification is based upon and claims the benefit of priority from United Kingdom patent application GB2318386.6 filed on Dec. 1st 2023, the entire contents of which is incorporated by reference.

BACKGROUND

Field of the Disclosure

The present disclosure relates to a method for reducing damage to a component of a gas turbine engine of an aircraft.

Components of high temperature mechanical systems, such as gas turbine engines, operate in severe, high-temperature environments. Typical components of high-temperature mechanical systems include a nickel or cobalt based superalloy substrate. In an attempt to reduce the temperatures experienced by the substrate, the substrate is coated with a thermal barrier coating (TBC).

Economic, and environmental concerns, i.e., increasing demands for improved efficiency and reduced emissions, continue to drive the development of advanced gas turbine engines with higher inlet temperatures. Some components of high-temperature mechanical systems may include a ceramic or ceramic matrix composite (CMC)-based substrate, which may allow an increased operating temperature compared to a component with a superalloy substrate. The CMC-based substrate may be coated with an environmental barrier coating (EBC) to reduce exposure of a surface of the substrate to environmental species, such as water vapor and oxygen.

Moreover, gas turbine engines are typically exposed to variable environmental conditions, such as variations in atmospheric agent compositions and high global variability of mineral dust. These mineral particles are generally ingested during routine engine operation in dusty and arid regions. This may lead to the deposition of ingested minerals/materials on surfaces of the components. Such deposition of the ingested minerals/materials may subsequently damage the TBCs and the EBCs. Specifically, such deposition may melt during operation of the gas turbine engine, thereby damaging the TBCs and the EBCs. The failure of the TBCs and the EBCs may cause the underlying alloy or CMC-based substrate to become exposed and damaged by heat. The corrosion of the alloy/CMC-based components may cause points of stress concentration and weakness that may result in eventual component failure.

SUMMARY

According to a first aspect there is provided a method for reducing damage to a component of a gas turbine engine of an aircraft. The component includes a substrate and a coating disposed on the substrate. The method includes determining one or more first atmospheric agents present in air that are predicted to be ingested by the gas turbine engine during operation in a predefined route of the aircraft. The method further includes determining a composition, a particle size, and a concentration of the one or more first atmospheric agents in the air at the predefined route. The method further includes determining a composition and an amount of a predicted deposit that is predicted to form on the component, due to the operation of the gas turbine engine in the predefined route, based on the composition, the particle size, and the concentration of the one or more first atmospheric agents in the air at the predefined route. The method further includes determining a predicted damage to the component based at least on: the composition and the amount of the predicted deposit; and a composition of the coating of the component. The method further includes determining one or more locations at which one or more second atmospheric agents are present in air that reduce the predicted damage to the component. The method further includes determining a composition, a particle size, and a concentration of the one or more second atmospheric agents in the air at the one or more locations. The method further includes determining an alternative route for the aircraft based on the composition, the particle size, and the concentration of the one or more second atmospheric agents in the air at the one or more locations. The alternative route includes the one or more locations. The alternative route is different from the predefined route. The method further includes operating the gas turbine engine in the alternative route of the aircraft, such that the gas turbine engine is operated at the one or more locations.

The method of the present disclosure may therefore reduce the predicted damage to the component of the gas turbine engine. Specifically, operating the gas turbine engine at the one or more locations of the alternative route may reduce the predicted damage to the component. The one or more second atmospheric agents may react with the predicted deposit to change at least one of the thermochemical property and the thermomechanical property of the predicted deposit. In some cases, the one or more second atmospheric agents may react with the predicted deposit to raise a melting temperature of the predicted deposit to above an operating temperature of the gas turbine engine and/or increase a viscosity of the predicted deposit in its molten phase. Further, the method may be economical, especially when compared to replacing the component with a new one after it incurs the predicted damage.

In some embodiments, the gas turbine engine is operated in the alternative route after a predetermined number of cycles of operation in the predefined route.

The predetermined number of cycles may be based on the composition, the particle size, and the concentration of the one or more first atmospheric agents in the predefined route. For example, the predicted deposit may not form in a significant amount before the predetermined number of cycles of operation in the predefined route. Therefore, operating the gas turbine engine in the alternative route after the predetermined number of cycles of operation in the predefined route may optimise the number of times the gas turbine engine is operated in the alternative route to reduce the predicted damage.

In some embodiments, the method further includes determining a composition and an amount of a pre-existing deposit formed on the component. The predicted damage is further determined based on the composition and the amount of the pre-existing deposit.

Therefore, the method may also reduce or prevent any damage that may be caused due to melts that may form from the pre-existing deposit. For example, the one or more second atmospheric agents may raise a melting temperature of the pre-existing deposit to above an operating temperature of the gas turbine engine and/or the one or more second atmospheric agents may increase a viscosity of the pre-existing deposit in its molten phase. The method may thus account for damage which may be caused by both the predicted deposit and the pre-existing deposit.

In some embodiments, the method further includes changing one or more operating parameters of the gas turbine engine, such that an operating temperature of the gas turbine engine reduces to below melting temperatures of the predicted deposit and the pre-existing deposit. For example, the method may include changing a thrust rating of the gas turbine engine to reduce the operating temperature of the gas turbine engine. When the operating temperature of the gas turbine engine is less than the melting temperatures of the predicted deposit and the pre-existing deposit, the predicted deposit and the pre-existing deposit may not form melts and therefore may not damage the component.

In some embodiments, determining the predicted damage is further based on a thickness of the coating of the component and a composition of the substrate of the component. In other words, the method may take into account the thickness of the coating of the component and the composition of the substrate. For example, thicker coatings may resist infiltration to a higher extent as compared to thinner coatings. In some embodiments, the predicted damage may be further determined based a density of the coating and/or a porosity of the coating. Other aspects of the coating may also be considered while determining the predicted damage.

In some embodiments, the one or more first atmospheric agents include at least one of calcium, magnesium, aluminium, silicon, sulphur, oxygen, hydrogen, carbon, sodium, and chlorine. For example, mineral dust and volcanic ash may contain calcium, magnesium, aluminium, silicon, sulphur, iron, and the like. Furthermore, in some cases, the one or more first atmospheric agents may include sodium and chlorine in the form of sodium chloride (NaCl).

In some embodiments, the one or more first and second atmospheric agents comprise natural aerosols and/or gases, such as volcanic ash, volcanic glass, volcanic gas, mineral dust, mineral sand, water, ice, sea salt, anthropogenic pollutant gases. In some embodiments, mineral dusts, mineral sands and volcanic ash comprise crystalline minerals and amorphous material including glasses derived from geological melts. Examples of these crystalline minerals are, but are not limited to, clay group minerals (e.g., smectites), mica group minerals (e.g., muscovite, phlogopite), feldspars (e.g., alkali feldspars such as albite; plagioclase feldspar), carbonates (e.g., calcite, dolomite), sulfates (e.g., anhydrite, gypsum) and silica minerals (e.g., quartz).

In some embodiments, the one or more first atmospheric agents and the composition, the particle size, and the concentration of the one or more first atmospheric agents in the air are determined via at least one of a meteorological database and a meteorological model. Thus, the one or more first atmospheric agents and the composition, the particle size, and the concentration thereof may be accurately determined.

In some embodiments, the one or more second atmospheric agents and the composition, the particle size, and the concentration of the one or more second atmospheric agents in the air are determined via at least one of a meteorological database and a meteorological model. Thus, the one or more second atmospheric agents and the composition, the particle size, and the concentration thereof may be accurately determined.

In some embodiments, the one or more second atmospheric agents react with the predicted deposit to change at least one of a thermochemical property and a thermomechanical property of the predicted deposit so as to reduce the predicted damage to the component.

For example, the reaction of the one or more second atmospheric agents with the predicted deposit may raise a melting temperature of the predicted deposit to above an operating temperature of the gas turbine engine. Additionally or alternatively, the reaction of the one or more second atmospheric agents with the predicted deposit may increase a viscosity of the predicted deposit in its molten phase. Consequently, the reaction of the one or more second atmospheric agents with the predicted deposit may reduce the predicted damage.

According to a second aspect there is provided an aircraft. The aircraft includes the gas turbine engine that is operated according to the method of the first aspect.

The gas turbine engine of the aircraft may require less maintenance breaks as the component may incur reduced damage and may not fail prematurely. Thus, the method may be economical, especially when compared to replacing the component with a new one after it incurs the predicted damage. Further, the gas turbine engine may advantageously be operated at locations including mineral dusts, volcanic ash, etc, without adverse effects on its components.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the FIGS, in which.

DETAILED DESCRIPTION

Aspects and embodiments of the present disclosure will now be discussed with reference to the accompanying FIGS. Further aspects and embodiments will be apparent to those skilled in the art.

Figure 1:
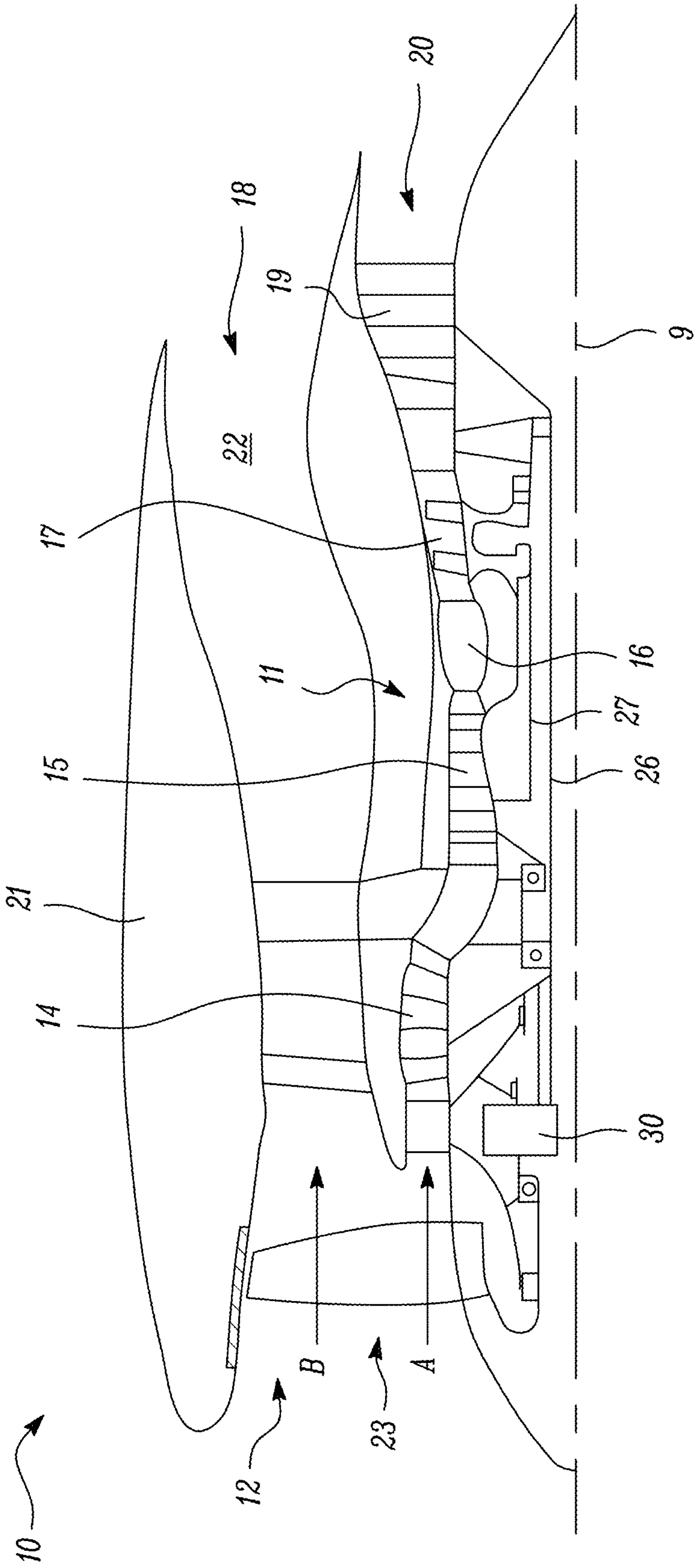
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
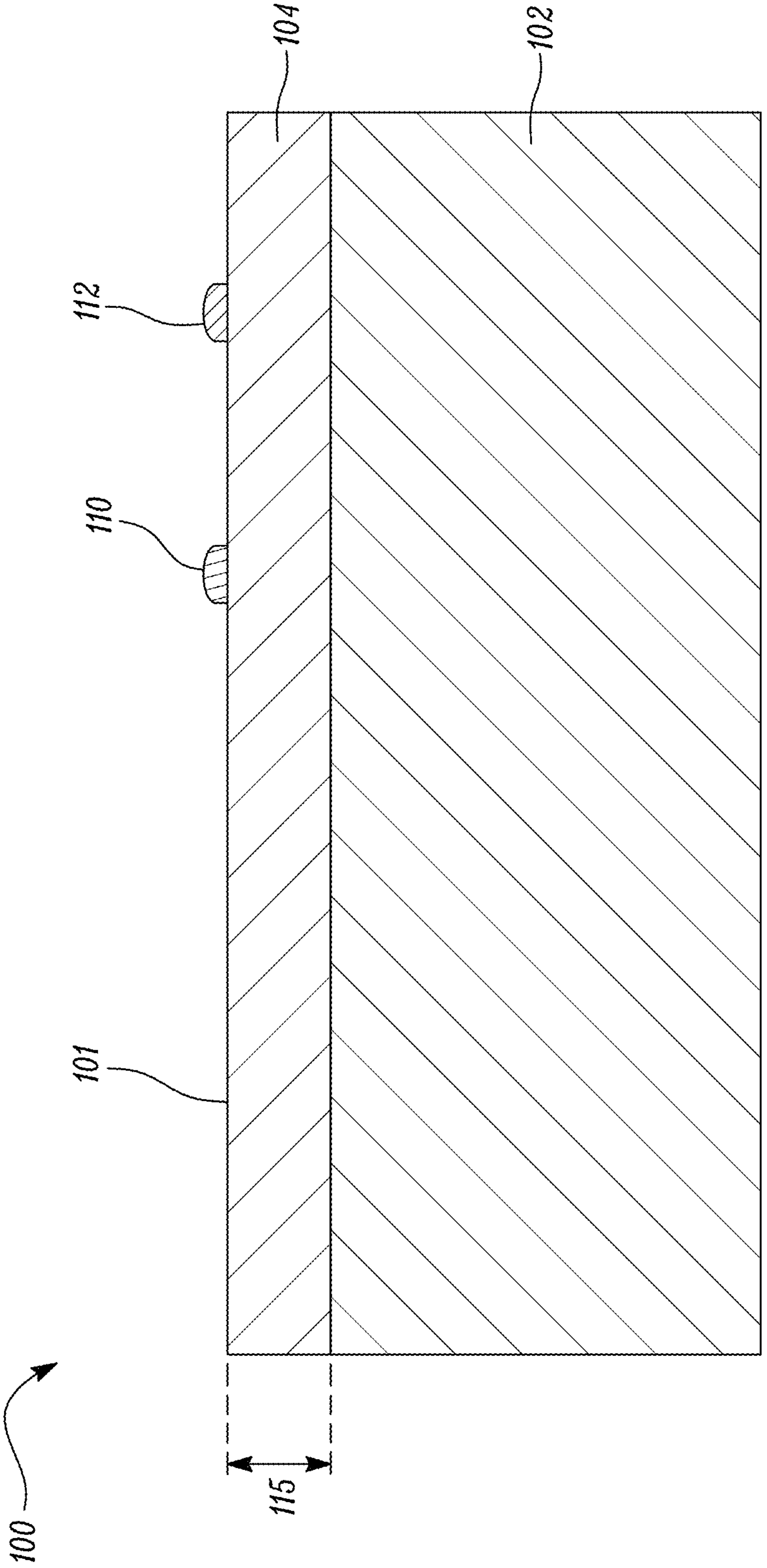
FIG. 2 is a schematic cross-sectional view of a component of a gas turbine engine in accordance with an embodiment of the present disclosure.

FIG. 2 shows a schematic cross-sectional view of a component 100 of a gas turbine engine (e.g., the gas turbine engine 10 of FIG. 1) in accordance with an embodiment of the present disclosure.

The component 100 may operate at high temperatures, which may be greater than about 1000° C., greater than about 1500° C., or greater than about 1600° C. Examples of the component 100 include, but are not limited to, seal segments, shrouds, combustion tubes, blade tracks, disc assemblies, aerofoils (e.g., blades or vanes), combustion chamber liners, and the like, of the gas turbine engine.

The component 100 includes a substrate 102 and a coating 104 disposed on the substrate 102. In some examples, the substrate 102 may include a metal alloy (e.g., a superalloy). Examples of metal alloys include, but are not limited to, Si-containing metal alloys such as molybdenum-silicon alloys (e.g., $MoSi_2$) and niobium-silicon alloys (e.g., $NbSi_2$), or a superalloy based on nickel (Ni), cobalt (Co), nickel/iron (Ni/Fe), or the like.

In some other examples, the substrate 102 may include a ceramic matrix composite (CMC). The CMC may include any ceramic matrix material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The coating 104 may be a thermal barrier coating (TBC), an environmental barrier coating (EBC), and the like. The coating 104 may be selected based on the substrate 102 and its composition, and application requirements of the component 100. Further, the coating 104 has a thickness 115. The thickness 115 of the coating 104 may also depend upon the application requirements of the component 100. For example, in some cases, the thickness 115 may be proportional to a temperature at which the component 100 operates. In some embodiments, the coating 104 may define a surface 101 of the component 100. The surface 101 may be an outer surface of the component 100.

While not shown in FIG. 2, the component 100 may further have a bond coat (not shown) disposed between the substrate 102 and the coating 104. The bond coat may improve a bonding between the substrate 102 and the coating 104.

The gas turbine engine including the component 100 may ingest one or more first atmospheric agents (e.g., mineral dust, volcanic ash, etc.) during operation. As a result, various deposits may form on the component 100, or more specifically, the surface 101 of the component 100. Such deposits may form a melt during operation of the gas turbine engine, and consequently may damage the component 100. Specifically, the melt formed from the deposits may damage the coating 104, and in some cases, may further damage the substrate 102 of the component 100. As used herein, the term "melt" refers to a deposit in its molten phase.

In the illustrated embodiment of FIG. 2, the deposits formed on the component 100 include a predicted deposit 110 and a pre-existing deposit 112. As used herein, the term "predicted deposit" refers to a deposit that is predicted to form on the component 100 during operation of the gas turbine engine on a specific route. Further, the term "pre-existing deposit" refers to a deposit that is already formed on the component 100 due to prior operation of the gas turbine engine on a specific route. The predicted deposit 110 and the pre-existing deposit 112 will now be discussed in greater detail with reference to FIG. 3.

Figure 3:
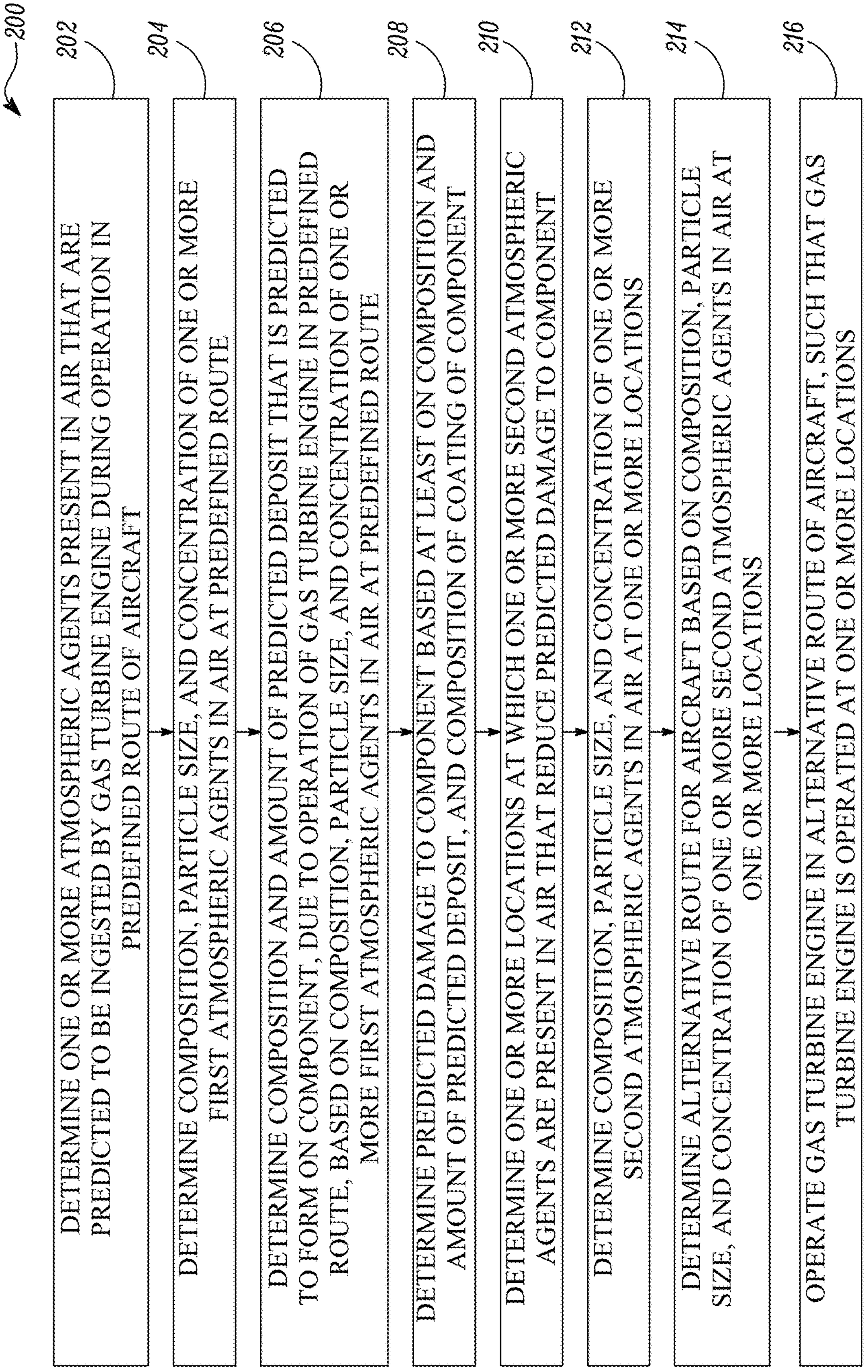
FIG. 3 is a flowchart depicting various steps of a method for reducing damage to the component in accordance with an embodiment of the present disclosure.

FIG. 3 shows a flowchart depicting various steps of a method 200 for reducing damage to a component (e.g., the component 100 of FIG. 2) of a gas turbine engine (e.g., the gas turbine engine 10 of FIG. 1) of an aircraft in accordance with an embodiment of the present disclosure. In some embodiments, one or more steps of the method 200 may be carried out by a processor.

Figure 4:
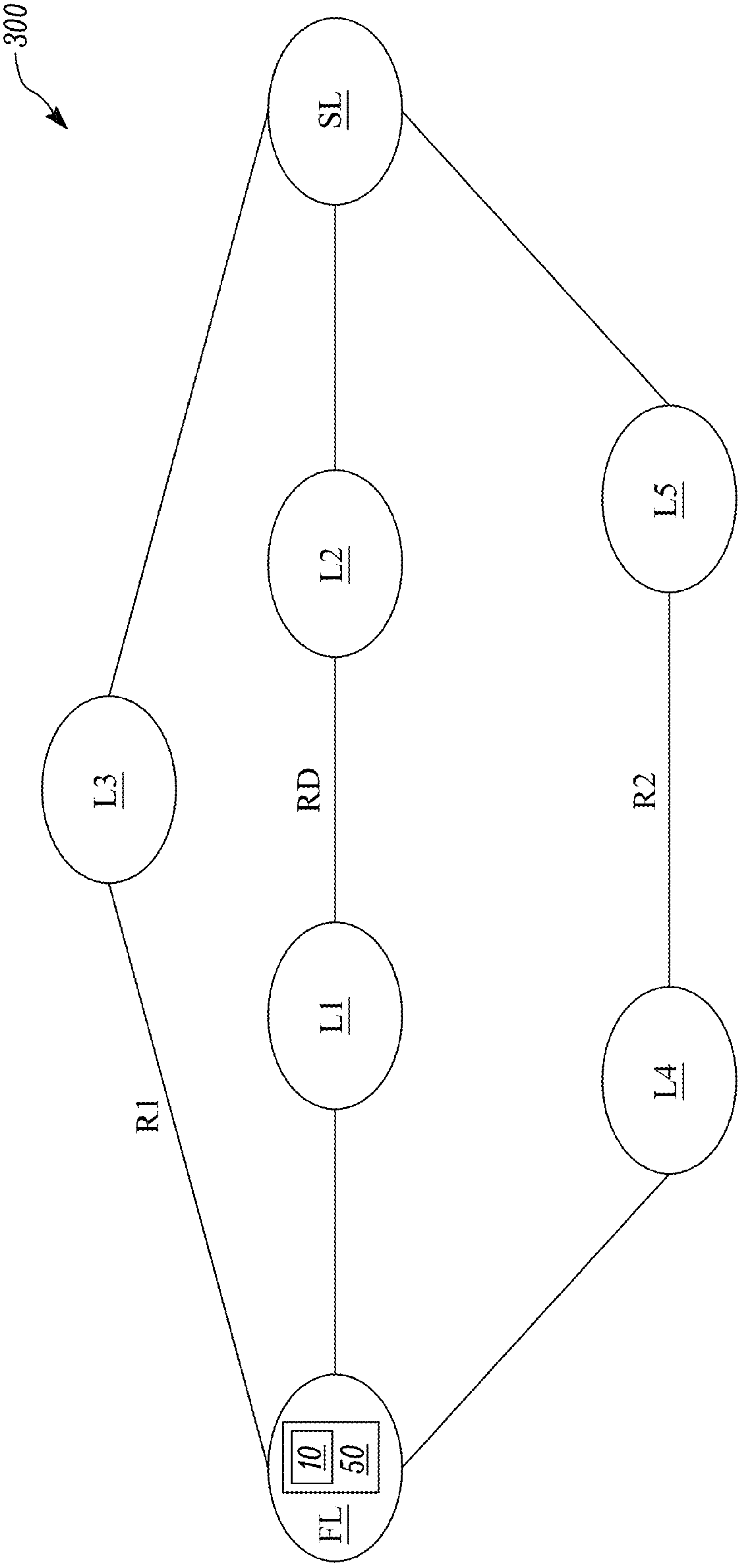
FIG. 4 is a graph depicting various routes of an aircraft in accordance with an embodiment of the present disclosure.

The method 200 will be discussed with reference to the gas turbine engine 10 of FIG. 1 and the component 100 of FIG. 2. However, the method 200 may also be implemented with gas turbine engines having other suitable engine configurations. FIG. 4 shows a graph 300 depicting various routes between two locations. The method 200 will also be explained with further reference to FIG. 4.

At step 202, the method 200 includes determining one or more first atmospheric agents present in air that are predicted to be ingested by the gas turbine engine during operation in a predefined route of the aircraft. Referring to FIG. 1, for example, the method 200 may include determining one or more first atmospheric agents that are predicted to be ingested by the gas turbine engine 10 during operation in a predefined route of an aircraft including the gas turbine engine 10.

As used herein, the term "predefined route" refers to a pre-planned route between a first location and a second location that an aircraft operates in to move from the first location to the second location. In some cases, a predefined route may be a least distance route between the first and second locations.

As used herein, the term "atmospheric agent" refers to any atmospheric agent that can participate in and/or catalyse formation of deposits that can form melts and potentially damage a component on which the deposits are formed. For example, an atmospheric agent may include mineral dust, a mixture of various different mineral dusts, volcanic ash, and so forth.

Therefore, the one or more first atmospheric agents may include mineral dust, a mixture of various different mineral dusts, volcanic ash, sulphur/sulphate gases, water, and any other atmospheric agents that can participate in and/or catalyse formation of deposits that can form melts and potentially damage the component.

The one or more first atmospheric agents may include at least one of calcium, magnesium, aluminium, silicon, sulphur, oxygen, hydrogen, carbon, sodium, and chlorine. For example, volcanic ash and mineral dust may contain calcium, magnesium, aluminium, silicon, sulphur, iron, and the like. Furthermore, in some cases, the one or more first atmospheric agents may include sodium and chlorine in the form of sodium chloride (NaCl).

The one or more first and one or more second atmospheric agents may comprise natural aerosols and/or gases, such as volcanic ash, volcanic glass, volcanic gas, mineral dust, mineral sand, water, ice, sea salt, anthropogenic pollutant gases.

Mineral dusts, mineral sands and volcanic ash may comprise crystalline minerals and amorphous material including glasses derived from geological melts. Examples of these crystalline minerals are, but are not limited to, clay group minerals (e.g., smectites), mica group minerals (e.g., muscovite, phlogopite), feldspars (e.g., alkali feldspars such as albite; plagiosclase feldspar), carbonates (e.g., calcite, dolomite), sulfates (e.g., anhydrite, gypsum) and silica minerals (e.g., quartz).

As will be described in greater detail below, the one or more first atmospheric agents that are predicted to be ingested by the gas turbine engine during operation in the predefined route of the aircraft may be determined meteorologically.

Referring to FIG. 4, for example, an aircraft 50 (shown schematically as a block) including the gas turbine engine 10 may operate between a first location FL and a second location SL via a predefined route RD. The first location FL and the second location SL may be locations of airports between which the aircraft 50 generally operates via the predefined route RD. In this example, the predefined route RD includes a location L1 and a location L2. It may be noted that the predefined route RD may include any number of locations. However, for explanatory purposes, it may be assumed that the location L1 and the location L2 include significant amount of atmospheric agents. Thus, the one or more first atmospheric agents that are predicted to be ingested by the gas turbine engine 10 during operation in the predefined route RD of the aircraft 50 may be assumed to be one or more of the atmospheric agents in air at the location L1 and the location L2.

At step 204, the method 200 further includes determining a composition, a particle size, and a concentration of the one or more first atmospheric agents in the air at the predefined route. Referring now to FIG. 4, for example, the method 200 may include determining a composition, a particle size, and a concentration of the one or more first atmospheric agents in the air at the predefined route RD. Specifically, in this example, the method 200 may include determining a composition, a particle size, and a concentration of the one or more first atmospheric agents in the air at the location L1 and the location L2.

In some examples, cumulative concentration of the one or more first atmospheric agents may be used to establish a damage threshold to the component.

In some embodiments, the one or more first atmospheric agents and the concentration of the one or more first atmospheric agents in the air are determined via at least one of a meteorological database and a meteorological model.

As used herein, the term "meteorological" refers to the scientific study of Earth's atmosphere and its changes, used especially in predicting what the weather will be like, and the particle size, chemical composition, and concentration of atmospheric agents.

As used herein, the term "meteorological database" refers to a large-scale database which stores meteorological data of a location/site that is acquired by various monitoring devices (e.g., satellites, sensors, radar, and so forth). The meteorological database may include historical meteorological data as well as predicted/forecasted meteorological data of the location/site, such as composition of air, wind speed and direction at various altitudes, humidity, sunlight intensity, pressure, precipitation (e.g., rain, snow, hail), pollution, wildfires, dust storms, salt spray, transport of particulate matter and volcanic ash, distribution of corrosion gases, and other meteorological parameters.

As used herein, the term "meteorological model" refers to a mathematical or a computational model that forecasts meteorological data of a location/site. In other words, a meteorological model may predict future meteorological data of the location/site based upon current and historical meteorological data of the location/site. A meteorological model may receive input data from a meteorological database and provide a forecast output based on the input data. The forecast output may also be stored in the meteorological database.

For example, the one or more first atmospheric agents and the composition, the particle size, and the concentration of the one or more first atmospheric agents present in the air may be determined based on the meteorological data taken from the World Health Organisation (WHO), the Met Office's Numerical Atmospheric-dispersion Modelling Environment (NAME), Quantitative Volcanic Ash (QVA) models, European Centre for Medium-Range Weather Forecasts (ECMWF), and the like.

As an example, for a given latitude, longitude, altitude, and time, the determined meteorological data from steps 202 and 204 may include: a sediment composition (in wt. %) of: $Na_2O$=5.72, CaO=29.76, MgO=14.09, $Al_2O_3$=8.21, $SiO_2$=35.18, FeO=4.53, $K_2O$=1.85, $TiO_2$=0.66; average relative humidity of 25%; average wind speed of 33 kilometres per hour (km/h); average pressure of 1017.9 millibars (mb); and average airborne mineral dust concentration of 1 microgram per metre cube ($\mu g/m^3$).

At step 206, the method 200 further includes determining a composition and an amount of a predicted deposit that is predicted to form on the component, due to the operation of the gas turbine engine in the predefined route, based on the composition, the particle size, and the concentration of the one or more first atmospheric agents in the air at the predefined route. Referring to FIGS. 2 and 4, for example, the method 200 may include determining a composition and an amount of the predicted deposit 110 that is predicted to form on the component 100, due to the operation of the gas turbine engine 10 in the predefined route RD (see FIG. 4), based on the composition, the particle size, and the concentration of the one or more first atmospheric agents in the air at the predefined route RD.

In some examples, determining the composition of the predicted deposit may further include determining thermochemical and thermophysical properties of the predicted deposit. In some examples, determining the amount of the predicted deposit may further include determining a thickness of the predicted deposit. In some examples, the composition and the amount of the predicted deposit may be determined further based on operating parameters of the gas turbine engine.

In some embodiments, the method 200 may further include determining a composition and an amount of a pre-existing deposit formed on the component. Referring to FIG. 2, for example, the method 200 may include determining a composition and an amount of the pre-existing deposit 112 formed on the component 100.

The composition and the amount of the pre-existing deposit may be measured by techniques such as, in-situ Raman spectroscopy, in-situ Low Energy Electron Diffraction (LEED), in-situ Laser Induced Breakdown Spectroscopy (LIBS), borescoping, deposit sampling, compositional analysis (e.g., X-Ray Diffraction), or by using a computational model.

The composition and amount of the predicted deposit (e.g., the predicted deposit 110 of FIG. 2) may be determined as a product of systematic, codified relationships between the concentration of the one or more first atmospheric agents and the composition and the amount of the pre-existing deposit, if present.

An example of such relationships include fractionation of the one or more first atmospheric agents as they travel through the gas turbine engine, and an amount of a deposit that forms from fractionated constituents of each of the one or more first atmospheric agents. The term "fractionation" of the one or more first atmospheric agents refers to a process of separating the constituents of each of the one or more first atmospheric agents based on a specific property, for example, particle size, composition, and the like. The amount of the predicted deposit that forms from the fractionated constituents of each of the one or more first atmospheric agents may be calculated by using computational models, such as a turbine deposition and accretion model.

Fractionation of the one or more first atmospheric agents may be a function of core dust dose values (in $mg/m^3$), which may be calculated, for example, using a computational model at any location, any time, and over any three-dimensional space using data from the European Centre for Medium-Range Weather Forecasts—Copernicus Atmosphere Monitoring Service (ECMWF-CAMS).

Fractionation of the one or more first atmospheric agents may further be a function of thermal and fluid dynamic parameters of the gas turbine engine at a specific thrust rating. The thermal and fluid dynamic parameters may be determined using computational models, such as performance and air systems models.

Fractionation of the one or more first atmospheric agents may further be a function of earlier deposition of dust constituents on other components of the gas turbine engine that are upstream of the component. This may be calculated using computational models such as deposition and accretion models.

Fractionation of the one or more first atmospheric agents may further be a function of reactivity and stability of the constituents of the one or more first atmospheric agents under a temperature profile within an engine core (e.g., the engine core 11 of FIG. 1) of the gas turbine engine. This may be calculated from the composition of each of the one or more first atmospheric agents using a thermodynamic modelling software.

As an example of a predicted deposit composition, for a high pressure turbine blade, the determined composition of the predicted deposit may be a deposit composition (in wt. %) of: $CaO$=34.10, $MgO$=7.76, $Al_2O_3$=10.91, $SiO_2$=43.41, $FeO$=1.15, $K_2O$=0.26, $SO_3$=0.03, $Na_2O$=2.35 at a core dose concentration of 10 $mg/m^3$.

At step 208, the method 200 further includes determining a predicted damage to the component based at least on the composition and the amount of the predicted deposit, and a composition of the coating of the component. Referring to FIG. 2, for example, the method 200 may include determining a predicted damage to the component 100 based at least on a composition and an amount of the predicted deposit 110, and a composition of the coating 104 of the component 100.

As used herein, the term "predicted damage" refers to an estimated damage caused to the component due to formation of melts from deposits on the component. Such deposits may include the predicted deposit and the pre-existing deposit.

In some embodiments, the predicted damage is further determined based on the composition and the amount of the pre-existing deposit. Referring to FIG. 2, for example, the predicted damage may be further determined based on the composition and the amount of the pre-existing deposit 112.

In some embodiments, determining the predicted damage is further based on a thickness of the coating of the component and a composition of the substrate of the component. Referring to FIG. 2, for example, determining the predicted damage may be further based on the thickness 115 of the coating 104 of the component 100 and a composition of the substrate 102 of the component 100. In other words, in some examples, the predicted damage to the component 100 may be determined based on the composition and the amount of the predicted deposit 110, the composition and the amount of the pre-existing deposit 112, the composition of the coating 104, the thickness 115 of the coating 104, and the composition of the substrate 102. In some embodiments, the predicted damage may be further based on a density of the coating 104 and/or a porosity of the coating 104. In some embodiments, the predicted damage may be further based on a thermal conductivity, a tortuosity, and a method of deposition of the coating 104 (e.g., EB-PVD, APS, SPS, and so forth). In some embodiments, the predicted damage may be further based on operating parameters of the gas turbine engine 10 (shown in FIG. 1).

The predicted damage may be quantified based on the thermochemical and/or thermomechanical properties of the predicted deposit 110 and/or the pre-existing deposit 112. The thermochemical and/or thermomechanical properties may include, for example, a melting profile between the solidus and liquidus temperatures of the deposit and the viscosity of the deposit. This may be determined using empirical data or calculated using a thermodynamic modelling software.

The predicted damage may be further quantified based on reactivity of a material of the component (e.g., nickel super-alloy, TBC, EBC) with the predicted deposit 110 and/or the pre-existing deposit 112. This may be calculated using, for example, solvation models, and libraries/look-up tables of compositional data of deposits formed on service-return components and thermodynamic data calculated using a thermodynamic modelling software.

The quantified predicted damage may include a depth and an extent of infiltration of a melt (of the predicted deposit and/or the pre-existing deposit) into the coating. The quantified predicted damage may further include a probability/extent of failure of the coating by, for example, cracking, blistering, spallation, and delamination due to the melt. The quantified predicted damage may further include formation of any corrosion products or new phases from reactions of the melt that has a deleterious effect on the coating and the substrate. The quantified predicted damage may further include reactive solvation/depletion of the coating and the substrate of the component by the melt. The quantified predicted damage may further include a probability/extent of pitting/cracking/corrosion of the substrate due to the melt.

Thus, the method 200 may be used to predict and quantify the damage to the component 100 that may potentially be caused by the ingestion of the one or more first atmospheric agents during operation of the gas turbine engine.

At step 210, the method 200 further includes determining one or more locations at which one or more second atmospheric agents are present in air that reduce the predicted damage to the component. That is, the one or more second atmospheric agents are predicted to be ingested by the gas turbine engine during operation at the one or more locations, and the one or more second atmospheric agents reduce the predicted damage to the component.

Specifically, the one or more second atmospheric agents may, for example, react with the predicted deposit and/or the pre-existing deposit to reduce the predicted damage to the component. More specifically, ingestion of the one or more second atmospheric agents by the gas turbine engine may reduce or prevent formation of melts from the predicted and the pre-existing deposits on the component.

In some embodiments, the one or more second atmospheric agents react with the predicted deposit to change at least one of a thermochemical property and a thermomechanical property of the predicted deposit so as to reduce the predicted damage to the component. Referring to FIG. 2, for example, the one or more second atmospheric agents may react with the predicted deposit 110 to change at least one of a thermochemical property and a thermomechanical property of the predicted deposit 110 so as to reduce the predicted damage to the component 100.

In some embodiments, the one or more second atmospheric agents may react with the pre-existing deposit to change at least one of a thermochemical property and a thermomechanical property of the pre-existing deposit so as to reduce the predicted damage to the component. Referring to FIG. 2, for example, the one or more second atmospheric agents may react with the pre-existing deposit 112 to change at least one of a thermochemical property and a thermomechanical property of the pre-existing deposit 112 so as to reduce the predicted damage to the component 100.

For example, the reaction of the one or more second atmospheric agents with the predicted deposit and/or the pre-existing deposit may raise a melting temperature of the predicted deposit and/or the pre-existing deposit to above an operating temperature of the gas turbine engine. Additionally or alternatively, the reaction of the one or more second atmospheric agents with the predicted deposit and/or the pre-existing deposit may increase a viscosity of the predicted deposit and/or the pre-existing deposit in their molten phase.

As previously disclosed, the one or more first and one or more second atmospheric agents comprise natural aerosols and gases, such as volcanic ash, volcanic glass, volcanic gas, mineral dust, mineral sand, water, ice, sea salt, anthropogenic pollutant gases. These mineral dusts, mineral sands and volcanic ash may comprise crystalline minerals and amorphous material including glasses derived from geological melts.

Crystalline minerals which may raise a melting temperature of the predicted deposit and/or the pre-existing deposit and/or increase a viscosity of the predicted deposit and/or the pre-existing deposit in their molten phase include carbonates (e.g., calcite, dolomite), clay group minerals (e.g., smectites), mica group minerals (e.g., muscovite, phlogopite), feldspars (e.g., alkali feldspars such as albite; plagioclase feldspar), sulfates (e.g., anhydrite, gypsum) and silica minerals (e.g., quartz).

Taking carbonates as an example, the one or more second atmospheric agent may comprise minerals with compositions high in CaO (calcium oxide) and/or MgO (magnesium oxide).

For example, dolomite contains: CaO=30.41 Wt. %, MgO=21.86 Wt. %, $CO_2$=47.73 Wt. %.

For example, calcite contains: CaO=56.03 Wt. %, $CO_2$=43.97 Wt. %.

Dolomite and calcite are highly abundant in evaporitic sediments and so are present in significant quantities in the dusts that form from these sediments.

Other minerals which have compositions high in CaO and/or MgO may also be comprised within the one or more second atmospheric agent. Other suitable oxides within the one or more second atmospheric agent may include $Al_2O_3$, $SiO_2$, FeO, $Fe_2O_3$, $K_2O$ and/or $Na_2O$.

Referring to FIG. 4, for example, the method 200 may include determining locations L3, L4, L5 at which one or more second atmospheric agents are present. Specifically, air at the locations L3, L4, L5 may include the one or more second atmospheric agents. In some cases, the locations L3, L4, L5 may be determined within a predefined distance from the first location FL and/or the second location SL.

At step 212, the method 200 further includes determining a composition, a particle size, and a concentration of the one or more second atmospheric agents in the air at the one or more locations. Referring to FIG. 4, for example, the method 200 may include determining a composition, a particle size, and a concentration of the one or more second atmospheric agents in the air at the locations L3, L4, L5.

In some embodiments, the one or more second atmospheric agents and the composition, the particle size, and the concentration of the one or more second atmospheric agents in the air are determined via at least one of a meteorological database and a meteorological model.

For example, the one or more second atmospheric agents and the composition, the particle size, and the concentration of the one or more second atmospheric agents present in the air may be determined based on the meteorological data taken from the World Health Organisation (WHO), the Met Office's Numerical Atmospheric-dispersion Modelling Environment (NAME), Quantitative Volcanic Ash (QVA) models, European Centre for Medium-Range Weather Forecasts (ECMWF), and the like.

At step 214, the method 200 further includes determining an alternative route for the aircraft based on the composition, the particle size, and the concentration of the one or more second atmospheric agents in the air at the one or more locations. The alternative route includes the one or more locations. Further, the alternative route is different from the predefined route.

Referring to FIG. 4, for example, the method 200 may include determining an alternative route R1 based on the composition, the particle size, and the concentration of the one or more second atmospheric agents in the air at the location L3. In some examples, the method 200 may include determining an alternative route R2 based on the composition, the particle size, and the concentration of the one or more second atmospheric agents in the air at the locations L4, L5. Further, the alternative route R1 and the alternative route R2 may be determined based on prospective risk factors (e.g., low/high risk of damage to the component if operated on the predefined route RD) and fuel consumption.

In some examples, a distance of the alternative route R1 may be compared with a distance of the alternative route R2 to select one of the alternative routes R1, R2 for the aircraft 50. For example, if the distance of the alternative route R1 is less than the alternative route R2, the alternative route R1 may be selected for the aircraft 50. In some cases, the method 200 may further include looking up a table including a list of airports that are considered to be in the alternative routes R1, R2. The alternative routes R1, R2 may thus further include one or more airports.

At step 216, the method 200 further includes operating the gas turbine engine in the alternative route of the aircraft, such that the gas turbine engine is operated at the one or more locations. Referring to FIG. 4, for example, the method 200 may include operating the gas turbine engine 10 in the alternative route R1 of the aircraft 50, such that the gas turbine engine 10 is operated at the location L3. In another example, the method 200 may include operating the gas turbine engine 10 in the alternative route R2 of the aircraft 50, such that the gas turbine engine 10 is operated at the locations L4, L5.

In some embodiments, the gas turbine engine is operated in the alternative route after a predetermined number of cycles of operation in the predefined route. Referring to FIG. 4, for example, the gas turbine engine 10 may be operated in the alternative route R1 after a predetermined number of cycles of operation in the predefined route RD. As an example, the predetermined number of cycles may be 100 cycles, 200 cycles, 300 cycles, and so forth.

The predetermined number of cycles may be based on the composition, the particle size, and the concentration of the one or more first atmospheric agents in the predefined route. For example, the predicted deposit may not form in a significant amount before the predetermined number of cycles of operation in the predefined route. Therefore, operating the gas turbine engine in the alternative route after the predetermined number of cycles of operation in the predefined route may optimise the number of times the gas turbine engine is operated in the alternative route to reduce the predicted damage.

In some embodiments, the method 200 further includes changing one or more operating parameters of the gas turbine engine, such that an operating temperature of the gas turbine engine reduces to below melting temperatures of the predicted deposit and the pre-existing deposit. The one or more operating parameters may include, for example, a thrust rating of the gas turbine engine.

Referring to FIGS. 1 and 2, for example, the method 200 may include changing one or more operating parameters of the gas turbine engine 10, such that an operating temperature of the gas turbine engine 10 reduces to below melting temperatures of the predicted deposit 110 and the pre-existing deposit 112. The thrust rating of the gas turbine engine 10 may be reduced to reduce a maximum temperature experienced by the component 100 to less than the melting temperature of the predicted deposit 110 and/or the pre-existing deposit 112.

Consequently, the operating temperature of the gas turbine engine may remain lower than melting temperatures of the predicted deposit 110 and the pre-existing deposit 112. Therefore, the predicted deposit 110 and the pre-existing deposit 112 may not form melts during operation of the gas turbine engine 10, thereby reducing damage to the component 100.

In an alternative embodiment, the method 200 may include, in place of steps 210-216, changing a time of day that the aircraft takes off from a given location (e.g., an airport) and lands on a given location.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method for reducing damage to a component of a gas turbine engine of an aircraft, the component having a substrate and a coating disposed on the substrate, the method comprising the steps of:

determining one or more first atmospheric agents present in air that are predicted to be ingested by the gas turbine engine during operation in a predefined route of the aircraft;

determining a composition, a particle size, and a concentration of the one or more first atmospheric agents in the air at the predefined route;

determining a composition and an amount of a predicted deposit that is predicted to form on the component, due to the operation of the gas turbine engine in the predefined route, based on the composition, the particle size, and the concentration of the one or more first atmospheric agents in the air at the predefined route;

determining a predicted damage to the component based at least on:

the composition and the amount of the predicted deposit; and a composition of the coating of the component;

determining one or more locations at which one or more second atmospheric agents are present in air that reduce the predicted damage to the component;

determining a composition, a particle size, and a concentration of the one or more second atmospheric agents in the air at the one or more locations;

determining an alternative route for the aircraft based on the composition, the particle size, and the concentration of the one or more second atmospheric agents in the air at the one or more locations, the alternative route comprising the one or more locations, wherein the alternative route is different from the predefined route; and operating the gas turbine engine in the alternative route of the aircraft, such that the gas turbine engine is operated at the one or more locations.

2. The method of claim 1, wherein the gas turbine engine is operated in the alternative route after a predetermined number of cycles of operation in the predefined route.

3. The method of claim 1, further comprising determining a composition and an amount of a pre-existing deposit formed on the component, wherein the predicted damage is further determined based on the composition and the amount of the pre-existing deposit.

4. The method of claim 3, further comprising changing one or more operating parameters of the gas turbine engine, such that an operating temperature of the gas turbine engine reduces to below melting temperatures of the predicted deposit and the pre-existing deposit.

5. The method of claim 1, wherein determining the predicted damage is further based on:

a thickness of the coating of the component; and a composition of the substrate of the component.

6. The method of claim 5, wherein determining the predicted damage is additionally based on at least one of:

a tortuosity of the coating;

a porosity of the coating;

a thermal conductivity of the coating; and a method of deposition of the coating.

7. The method of claim 1, wherein the one or more first atmospheric agents comprise at least one of calcium, magnesium, aluminium, silicon, sulphur, oxygen, hydrogen, carbon, sodium, and chlorine.

8. The method of claim 1, wherein the one or more first atmospheric agents and the composition, the particle size, and the concentration of the one or more first atmospheric agents in the air are determined via at least one of a meteorological database and a meteorological model.

9. The method of claim 1, wherein the one or more second atmospheric agents and the composition, the particle size, and the concentration of the one or more second atmospheric agents in the air are determined via at least one of a meteorological database and a meteorological model.

10. The method of claim 1, wherein the one or more second atmospheric agents react with the predicted deposit to change at least one of a thermochemical property and a thermomechanical property of the predicted deposit so as to reduce the predicted damage to the component.

11. The method of claim 1, where the second atmospheric agent comprises at least one of CaO, MgO, $Al_2O_3$, $SiO_2$, FeO, $Fe_2O_3$, $K_2O$, $Na_2O$.

12. The method of claim 11, where the second atmospheric agent comprises at least one of dolomite, calcite, quartz, plagioclase feldspar, alkali feldspar, mica, clay, gypsum, halite, hematite.

13. An aircraft including a gas turbine engine, wherein the gas turbine engine is operated according to the method of claim 1.

* * * * *